(12) United States Patent
Reuschel et al.

(10) Patent No.: US 8,591,382 B2
(45) Date of Patent: Nov. 26, 2013

(54) METHOD FOR CONTROLLING A FRICTION CLUTCH

(75) Inventors: Michael Reuschel, Ottersweier (DE); Christian Eberle, Buehl (DE); Lutz Helmbrecht, Rheinmuenster (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 72 days.

(21) Appl. No.: 13/354,798

(22) Filed: Jan. 20, 2012

(65) Prior Publication Data

US 2012/0115681 A1 May 10, 2012

Related U.S. Application Data

(63) Continuation of application No. PCT/DE2010/000732, filed on Jun. 24, 2010.

(30) Foreign Application Priority Data

Jul. 20, 2009 (DE) .......................... 10 2009 033 922

(51) Int. Cl.
*F16D 48/06* (2006.01)

(52) U.S. Cl.
USPC ........................................................ 477/166

(58) Field of Classification Search
USPC ............................ 477/166; 192/30 W; 701/68
See application file for complete search history.

(56) References Cited

U.S. PATENT DOCUMENTS

| | | | |
|---|---|---|---|
| 5,065,849 A * | 11/1991 | Kono et al. | 477/86 |
| 6,415,899 B1 * | 7/2002 | Gochenour et al. | 192/70.14 |

FOREIGN PATENT DOCUMENTS

| | | |
|---|---|---|
| DE | 10 2005 061 080 A1 | 7/2006 |
| DE | 10 2006 008 755 A1 | 8/2007 |
| DE | 10 2007 013 113 A1 | 9/2008 |
| DE | 10 2007 053706 A1 | 5/2009 |
| WO | 2005/057039 A1 | 6/2005 |

OTHER PUBLICATIONS

Machine translation of specification of DE 10 2007 013 113 (Volkswagen AG) Sep. 25, 2008.*
Machine translation of claims of DE 10 2007 013 113 (Volkswagen AG) Sep. 25, 2008.*
Machine translation of specification of WO 2005/057039 (GKN Driveline INT GMBH) Jun. 23, 2005.*
Machine translation of claims of WO 2005/057039 (GKN Driveline INT GMBH) Jun. 23, 2005.*

* cited by examiner

*Primary Examiner* — Sherry Estremsky
(74) *Attorney, Agent, or Firm* — Lucas & Mercanti, LLP

(57) ABSTRACT

A method for controlling a friction clutch operatively arranged between a drive unit and a gearbox. The method includes the steps of detecting torque transmitted by the friction clutch, determining a coefficient of friction between friction linings of a clutch disk and antifriction surfaces of the friction clutch, and evaluating the functional capability based on the determined coefficient of friction. In order to avoid an evaluation of a friction clutch that has not yet been broken-in as a worn friction clutch, the evaluation is postponed during a specified breaking-in phase of the friction clutch.

8 Claims, 1 Drawing Sheet

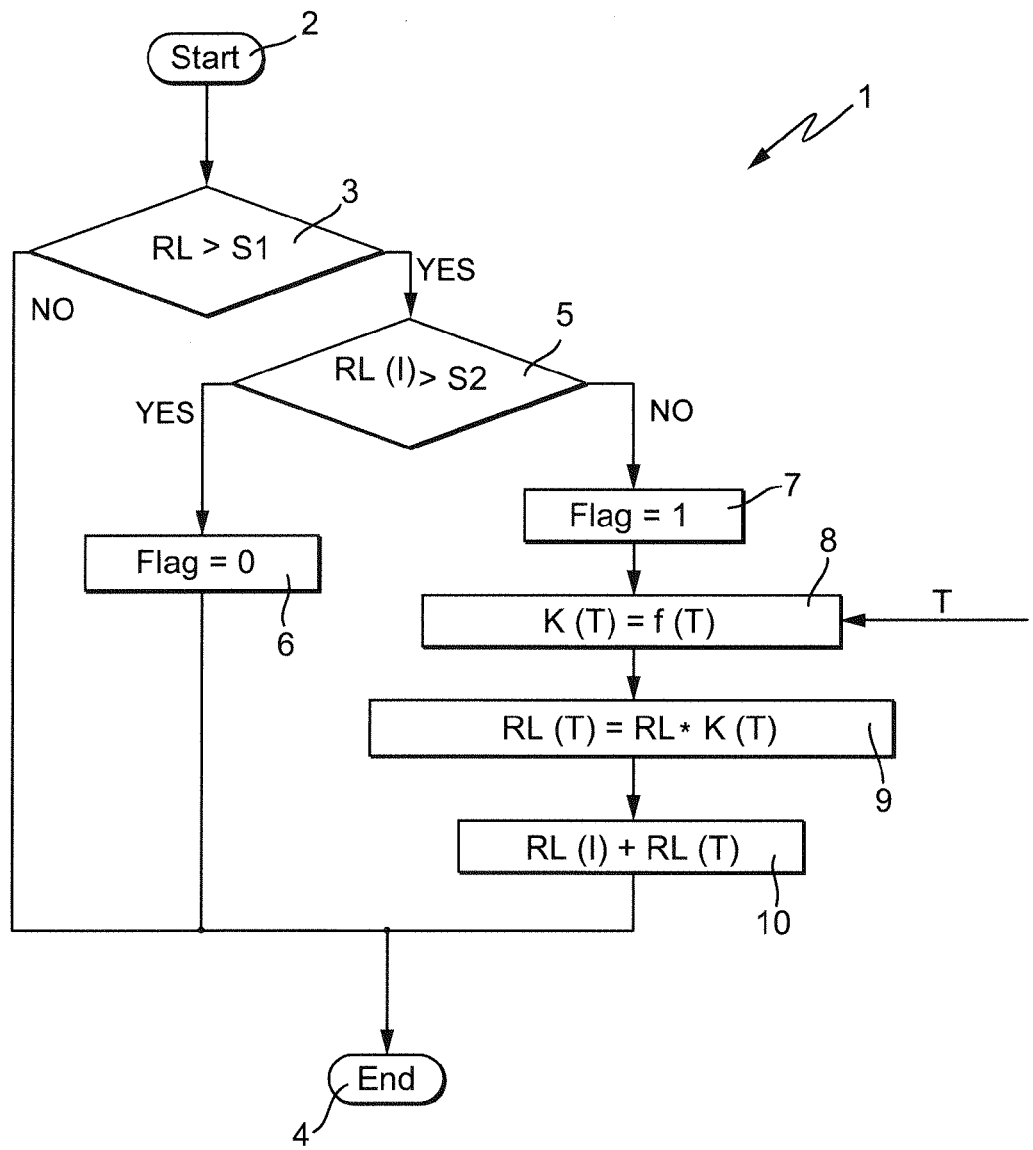

METHOD FOR CONTROLLING A FRICTION CLUTCH

CROSS-REFERENCE TO RELATED APPLICATIONS

This application is a continuation of PCT/DE2010/000732 filed Jun. 24, 2010, which in turn claims the priority of DE 10 2009 033 922.1 filed Jul. 20, 2009. The priority of these applications is hereby claimed and these applications are incorporated by reference herein

FIELD OF THE INVENTION

The invention relates to a method for controlling a friction clutch which is arranged to act between a drive unit and a gearbox.

BACKGROUND OF THE INVENTION

A method for identifying damage to a friction clutch arranged between a drive unit and a gearbox is known from DE 10 2005 061 080 A1. Here, the damage is derived from individual damage values determined on the basis of the frictional power input into the friction clutch. If the determined individual damage values exceed a threshold, the friction clutch is evaluated as being damaged.

Such monitoring systems are used in particular for reliable, economical and comfortable operation. For example, these monitoring systems are used in dual clutch gearboxes in which the friction clutches are subject to intense loading, in particular, at high load and during overlapping shifts. In this way it is sought to reliably detect during operation whether one or both friction clutches is not reliably transmitting the torque to be transmitted and has, for example, increased slip at the presently applied torque of the drive unit.

In new friction clutches, which have not yet been run in, relatively low friction coefficients are obtained because the friction pairing of friction linings of the clutch disk and the counterpart friction surfaces of the friction clutch has not yet been run in. This may be attributed, inter alia, to the fact that the friction linings, which are still relatively uneven after manufacture, have, on a microscopic scale, only a small contact area with the counterpart friction surfaces of the pressure plate or of the counterpart pressure plate. With progressive run-in duration, the unevenesses of the friction linings and also the counterpart friction surfaces are worn away and a larger effective friction surface is formed. This leads to higher friction coefficients, which are used as a basis for the evaluation of the friction clutch as being functionally capable.

Friction clutches which have not yet been run in can lead to over-revving of the drive unit at the torque of the drive unit applied under normal conditions and can be identified as worn by an evaluation routine. This can erroneously lead to a complaint and an associated exchange of the friction clutch in question, or, in the case of a dual clutch of a dual clutch gearbox, to the complete exchange of the dual clutch.

SUMMARY OF THE INVENTION

The present invention relates to a method for controlling a generic friction clutch, which has an evaluation system that operates reliably and avoids a misdiagnosis when the friction clutch is still in the run-in phase.

More specifically, the present invention is directed to a method for controlling a friction clutch, which is arranged so as to act between a drive unit and a gearbox, where a torque transmitted via the friction clutch is detected, a friction coefficient between friction linings of a clutch disk and the counterpart friction surfaces of the friction clutch is determined, and the functional capability on the basis of the determined friction coefficient is evaluated. The evaluation is suspended during a predefined run-in phase of the friction clutch. The method according to the invention may be used for individual automated friction clutches or for dual clutches with two friction clutches for in each case one component drivetrain of a dual clutch gearbox.

Here, the evaluation of correct functional capability may take place as a function of the total energy input into the friction clutch. An evaluation of the friction clutch as being defective, for example worn, is suspended, and the run-in phase activated, until a threshold of the total amount of energy input into the friction clutch is reached or exceeded. After the reaching or exceeding the total energy threshold, which may be oriented to a typical run-in phase of the friction clutch, the evaluation of the friction clutch is continued or started in the usual way.

To assess whether the threshold of the total energy has been reached or exceeded, the frictional power input into the friction clutch can be integrated with respect to time, such that the sum of the total energy input into the clutch is used to determine whether the run-in phase of the friction clutch is ended. Here, corresponding empirical values may be used, if appropriate with a suitable safety margin, to define the threshold of the total energy.

Alternatively or in addition, during the run-in phase, the determination of the input total energy may be expanded with the integration of the frictional power input into the clutch taking place only above a predefined threshold of the frictional power. The corresponding energy or power threshold values are expediently defined separately for each clutch, and the input frictional energies are determined in a clutch-specific manner.

Here, it has been found that the effect of the integrated frictional power or input frictional energy is highly dependent on the temperature of the friction clutch, such that advantageously the individually determined energies are each weighted with the presently prevailing temperature of the friction clutch or a damage index under extreme operating circumstances such as driving with a trailer, hill-starting under load, and the like.

In one embodiment, to define a run-in phase, a signal, for example a so-called run-in flag, may be set in a control routine for controlling the friction clutch. The evaluation is suspended while the signal is active, and the signal is cancelled when the threshold of the total energy is reached, such that a regular execution of the evaluation routine for determining clutch damage or clutch wear is ensured.

To prevent damage to components of the friction clutch, for example as a result of thermal loading, a reduction in comfort as a result of an over-revving drive unit, the evaluation of the friction clutch as being damaged or worn in other monitoring routines, for example the gearbox control software, and/or other effects of a friction clutch which has not yet been run in, it is possible, during the run-in phase, for the torque of the drive unit to be limited to the maximum torque that can be transmitted via the friction clutch.

In an alternative method for evaluating whether the run-in phase has ended, a histogram of the frictional energy input into the friction clutch or the power classes of the arising frictional energies may be established, and the run-in behavior of the friction clutch can be evaluated by an evaluation of the histogram.

BRIEF DESCRIPTION OF THE DRAWING

The invention will be explained in more detail on the basis of the single FIGURE.

The FIGURE shows a routine for suspending an evaluation method of a friction clutch during a run-in phase.

DETAILED DESCRIPTION OF THE INVENTION

The FIGURE shows a block diagram of the routine 1 for assessing the run-in behavior of an automated friction clutch, for example a dual clutch. The routine 1 is started in block 2. In the branch 3, it is determined whether the frictional power RL input into the friction clutch is greater than a threshold S1 of the frictional power. In this way it is sought to prevent frictional power values, which are not of significance for the run-in behavior of the friction clutch, from being included in the integration of the frictional power. The routine 1 is run through in predefined, for example cyclic time intervals, such that a frictional power RL is integrated in each case for a predefined time interval. If the frictional power is less than or equal to the threshold S1, the run-in signal is set to zero, and the routine 1 is ended in block 4.

If the frictional power RL input into the friction clutch is greater than the threshold S1, it is evaluated in the branch 5 whether the integrated frictional power RL(I), which corresponds to the previously detected input frictional energy, is greater than the threshold of the total energy S2 of the integrated frictional power RL(I), which serves as a measure for a completed run-in process. If the total integrated frictional power RL(I) exceeds the threshold of the total energy S2, the run-in signal Flag is set to zero and the routine 1 is ended in the block 4. If the run-in phase has not yet been completed because an integrated frictional power RL(I) is less than or equal to the threshold of the total energy S2, the run-in signal is set equal to one, that is to say activated, in block 7.

In the subsequent block 8, the temperature-dependent weighting factor K(T) is determined from a temperature function f(T) or from a dependency, stored in a characteristic curve or a characteristic map, of the weighting factor K(T) on the temperature T of the friction clutch. Here, the temperature T of the friction clutch is determined in the form of a clutch temperature model or by means of a temperature sensor.

In block 9, the temperature-weighted frictional power RL(T) is formed by multiplication of the frictional power RL that is determined, for example from the torque of the drive unit and the slip of the friction clutch, by the weighting factor K(T).

In block 10, the present, temperature-weighted frictional power RL(T) is added to the integrated frictional power RL(I) and the routine 1 is ended in block 4. A re-start of the routine 1 in block 2 takes place after the expiry of a predefined time interval, until the routine is finally ended by the setting of the run-in signal to zero.

It is self-evident that this determination may be carried out individually for each clutch.

LIST OF REFERENCE SYMBOLS

1 Routine
2 Block
3 Branch
4 Block
5 Branch
6 Block
7 Block
8 Block
9 Block
10 Block
Flag Run-In Signal
f(T) Temperature Function
K(T) Temperature-Dependent Weighting Factor
RL Frictional Power
RL(I) Integrated Frictional Power
RL(T) Temperature-Weighted Frictional Power
S1 Threshold, Frictional Power
S2 Threshold, Total Energy of the Integrated Frictional Power
T Temperature of the Friction Clutch

What is claimed:

1. A method for controlling a friction clutch, which is arranged so as to act between a drive unit and a gearbox and which has a clutch disk with friction linings and counterpart friction surfaces, the method comprising the steps of:
   detecting a torque transmitted via the friction clutch;
   determining a friction coefficient between the friction linings of the clutch disk and the counterpart friction surfaces of the friction clutch;
   evaluating functional capability based on the friction coefficient determined; and
   suspending the evaluating step during a predefined run-in phase of the friction clutch.

2. The method as claimed in claim 1, including activating the run-in phase until a threshold of a total amount of energy input into the friction clutch is reached.

3. The method as claimed in claim 2, including forming the total amount of energy input by integrating an associated frictional power.

4. The method as claimed in claim 3, wherein integrating the frictional power input takes place only above a predefined threshold of the frictional power.

5. The method as claimed in claim 3, including weighting a calculation of the total amount of energy as a function of a temperature of the friction clutch prevailing at the frictional power determined.

6. The method as claimed in claim 1, including, during the run-in phase, setting a signal, and suspending the evaluation while the signal is active.

7. The method as claimed in claim 1, including, during the run-in phase, limiting a torque of the drive unit to a maximum torque that can be transmitted via the friction clutch.

8. The method as claimed in claim 1, including establishing a histogram of frictional energy input into the friction clutch or of power classes of arising frictional energies, and evaluating run-in behavior of the friction clutch by evaluating the histogram.

* * * * *